United States Patent
James et al.

(10) Patent No.: US 11,292,921 B2
(45) Date of Patent: Apr. 5, 2022

(54) HIGH PERFORMANCE ANTIMICROBIAL COATING COMPOSITION

(71) Applicant: PISON STREAM SOLUTIONS INC., Brecksville, OH (US)

(72) Inventors: Joseph H. James, New York, NY (US); Sanjana Das, New York, NY (US)

(*) Notice: Subject to any disclaimer, the term of this patent is extended or adjusted under 35 U.S.C. 154(b) by 252 days.

(21) Appl. No.: 16/529,347

(22) Filed: Aug. 1, 2019

(65) Prior Publication Data

US 2021/0032481 A1    Feb. 4, 2021

(51) Int. Cl.
| | |
|---|---|
| C09D 5/14 | (2006.01) |
| C09D 7/65 | (2018.01) |
| C09D 7/61 | (2018.01) |
| C09D 167/02 | (2006.01) |
| C09D 7/40 | (2018.01) |
| B05D 1/04 | (2006.01) |

(52) U.S. Cl.
CPC .............. *C09D 5/14* (2013.01); *C09D 7/61* (2018.01); *C09D 7/65* (2018.01); *C09D 7/70* (2018.01); *C09D 167/02* (2013.01); *B05D 1/04* (2013.01); *B05D 2401/20* (2013.01)

(58) Field of Classification Search
None
See application file for complete search history.

(56) References Cited

U.S. PATENT DOCUMENTS

| | | |
|---|---|---|
| 8,258,202 B2 | 9/2012 | Chasser |
| 8,877,256 B2 | 11/2014 | Dudnik |
| 2017/0086455 A1 | 3/2017 | Gisser |
| 2018/0105700 A1 | 4/2018 | Mistry |
| 2018/0237642 A1 | 8/2018 | Gelling |

FOREIGN PATENT DOCUMENTS

| | | | |
|---|---|---|---|
| WO | WO 02/087339 | * | 4/2002 |
| WO | WO 2018/189317 | * | 10/2018 |

* cited by examiner

*Primary Examiner* — Robert T Butcher
(74) *Attorney, Agent, or Firm* — Duane Morris LLP; Gregory M. Lefkowitz

(57) ABSTRACT

An antimicrobial coating composition is disclosed. The composition delivers several orders of magnitude improvement in the reduction of infectious materials (i.e., microbial substances, including bacteria, fungus, germs, and other pathogens). An advanced high performance antimicrobial coating composition that is able to eliminate and reduce the bacteria and germ count at a log reduction of greater than 5 within 10 minutes of exposure.

28 Claims, No Drawings

HIGH PERFORMANCE ANTIMICROBIAL COATING COMPOSITION

FIELD OF INVENTION

The invention relates to chemical coating compositions and, more specifically, to antimicrobial formulations for such coatings that provide superior protection against microbes, bacteria, germs, and other pathogens on various substrates by reducing or completely eliminating bacteria and germ count at a log reduction of greater than 5 within 10 minutes of exposure.

BACKGROUND OF INVENTION

Powder coating compositions are dry free flowing powders applied in the fusion coating process. In that process, a specific formulation of base resins and additives is applied to a surface, which is heated so that the formulation melts and fuses into a uniform coating upon cooling.

Powder coatings can vary from function to function and can be applied in almost any field. One particularly promising, but heretofore mostly ignored, application is in the healthcare field. Generally speaking, antimicrobial coatings prevent or inhibit the growth of bacteria, microbes, germs and other pathogens on surfaces to which they are applied; however, relatively few powder coating formulations have been developed in this regard.

Antimicrobial coatings can be particularly useful because they can be applied to just about any surface, including walls, door handles, counters, high-touch areas and other tough-to-clean/access areas such as mechanicals and HVAC systems. Further, these coatings could find utility in medical devices and instruments, personal articles, laboratory equipment, ticketing machines, telephones, computers, public transport, factories, furniture, water filtration equipment, hospitals, school/childcare facilities, airports, restaurants, gyms, etc.

One major problem facing applicators of antimicrobial coating materials is the inability of the coating to reduce the amount of bacteria beyond 99.9%. Bacteria of particular concern include *Staphylococcus aureus* (Staph), *Escherichia coli* (*E. coli*), Methicilllin-Resistant *Staphylococcus aureus* (MRSA) and Vancomycin-Resistant *Enterecoccus faecalis* and *Enterobacter aerogenes* (VRE).

*Staphylococcus* (Staph) is a group of bacteria, there are more than 30 types. Staph bacteria can cause many different types of infections, including; skin infections, food and blood poisoning. Most strains of *Escherichia coli* (*E. coli*) are not harmful but are part of the healthy bacterial flora in the human gut. However, some strains can cause various diseases, including pneumonia, urinary tract infections, diarrhea and meningitis. Some strains of *E. coli* infection can also cause nausea, vomiting and fever. Methicillin-Resistant *Staphylococcus aureus* (MRSA) is a type of bacterium that causes infections in different parts of the body. It is relatively more difficult to treat than most other strains of *Staphylococcus aureus* (staph) because it is resistant to antibiotics. It can cause serious skin, bloodstream, lungs or urinary tract infections. Vancomycin-Resistant Enterococci (VRE) are a type of bacteria called Enterococci that have developed resistance to many antibiotics, especially Vancomycin as the name suggests. These bacteria can cause serious infections, especially in people who are already ill or weak. VRE may cause bloodstream infection (sepsis), urinary infection, pneumonia, heart infections (endocarditis), or meningitis.

These are merely examples of various bacterial and microbial infections that are becoming increasingly common owing to over-use of antibiotics drugs and antibacterial soaps/sprays, the natural evolution of species, and the relative lack of viable, mass-produced bacteria- and microbial-free substrates (absent the use of drugs and/or soaps/sprays).

In the chemical coatings industry, a 99.9% percent reduction in bacteria translates to a three order of magnitude reduction in bacterial and microbial risk (i.e., 3 log)—although even this level might not be enough as it doesn't completely inhibit the growth of microorganisms. Furthermore, existing antimicrobial coatings tend to deteriorate with time and lose effectiveness as contamination is repeated.

Conventional coating products claiming to deliver antibacterial properties include PaintGuard from the Sherwin Williams Company (Cleveland, Ohio); Alesta AM and Alesta Ralguard from Axalta (Philadelphia, Pa.) and Silversan from PPG (Pittsburgh, Pa.). However, these products generally claim to be 99.9% effective, taking over 5 hours after application to reach their maximum efficiency. Further, existing solutions tend to degrade over time, so that their active performance goes below 90% after recontamination (i.e., repeated exposure to pathogens in combination with routine environmental exposure and/or scrubbing/cleaning over prolonged periods of time). At just 90% protection, bacteria and germs have the ability to grow and respire, eventually multiplying to the point where existing pathogens on the substrate layer will persist, thereby decreasing the efficacy of these coatings.

Previous efforts to increase effectiveness of antimicrobial coatings tend to rely on silver-based (e.g., silver nitrate) formulations. Such formulations aren't entirely satisfactory, as they only lead to a 3 log reduction that fails to completely inhibit respiration and regrowth of bacteria. This lack of effectiveness can probably be attributed to the fact that silver is used insufficient amounts and/or is unevenly dispersed throughout the composition, resulting in an inconsistent and, ultimately, ineffective distribution of anti-microbial particles within the composition/coating.

United States Patent Publications 2018/0237642 and 2018/0105700 propose the use of inorganic bismuth-containing compounds for microbe-resistance. Similarly; United States Patent Publication 2017/0086455 describes a biocidal paint delivering a 3 log reduction in bacteria within two hours. Finally, U.S. Pat. No. 8,258,202 discloses a film-forming composition including a porous solid ion-exchange ceramic with pores containing anti-microbial metal ions in combination with a halogen ion-containing onium, while U.S. Pat. No. 8,877,256 provides an example of silver-based anti-microbial composition. The disclosure of all of these documents are incorporated by reference.

SUMMARY OF INVENTION

An antimicrobial coating composition is disclosed herein (also referred to as Misurfactute™) that is particularly advantageous because it reduces bacteria up to 99.9998% in comparison to untreated surfaces. This constitutes above five orders of magnitude or more (i.e., 5 log reduction), which is marked improvement over conventional antimicrobial products available today. Further, the inventive composition prevents the spread of microbes across surfaces over a period of up to twelve months, despite repeated contamination and can be applied to almost any and all substrates.

In particular, a combination of polyester hydroxyl resins and spherical glass flakes are blended in conjunction with one or more polymeric curatives. One ore more antimicrobial metals are used in combination with an inorganic or polymeric material (e.g., silanes). Polyethylene wax and a cross linking agent are also provided, and the formulation is blended and extruded as master batch inhibits growth and respiration of bacteria tremendously.

The antimicrobial coating disclosed herein delivers the following characteristics and advantages in comparison to currently available antimicrobial coatings:

Protection against the growth and adverse effects of various microbes, bacteria and germs Staph (*Staphylococcus aureus*), *E. coli* (*Escherichia coli*), MRSA (Methicillin-Resistant *Staphylococcus aureus*), VRE (Vancomycin-Resistant *Enterococcus faecalis* and *Enterobacter aerogenes*)

A log reduction between 5.5-6.5, that is up to 99.9999% effective in eliminating and reducing the growth of various microbes, bacteria, and germs.

Universally applicable to any substrate, paints, coatings and polymers.

Increased resistance to microorganisms, up to seven times more effective than preexisting antimicrobials.

Increased durability in comparison to conventional antimicrobial coatings, particularly in terms of recontamination and/or withstanding repeated cleaning and scrubbing, resulting in long-lasting protection against fungi, mold, and bacteria for up to 12 months.

Relatively quick and simple processing (cure time of 10 min. @ 375° F. or 20 min. @ 350° F., using a convection oven such as a laboratory oven from Blue M, White Deer, Pa.)

Free of Volatile Organic Compounds (VOC's) and/or carcinogens, causing little to no toxic emissions, odor, or degradation of air quality.

Prepared as a powder or liquid coating.

Owing to the foregoing improvements, enhances the utility and resale value of articles to which the coating is applied.

Further reference is made to the appended claims and description below, all of which disclose elements of the invention. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DETAILED DESCRIPTION

Reference will now be made in detail to exemplary embodiments of the present invention. It is to be understood that other embodiments may be utilized and structural and functional changes may be made without departing from the respective scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Any elements described herein as singular can be pluralized (i.e., anything described as "one" can be more than one). Any species element of a genus element can have the characteristics or elements of any other species element of that genus. The described configurations, elements or complete assemblies and methods and their elements for carrying out the invention, and variations of aspects of the invention can be combined and modified with each other in any combination. As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

The table below shows one example of an antimicrobial coating composition in accordance with one embodiment of the invention and approximated weight ranges covering other embodiments of the invention. Any number within the disclosed range (up to the significant digits shown) is specifically disclosed, as well as all the various combinations and permutations of specific values for the various components. With respect to the ancillary components, it may be possible to include other functional items commonly found in powdered and non-solvent based coatings. Finally, relative ratios of various, specific components and subgroupings of components are both contemplated and disclosed in the table below.

TABLE 1

Exemplary formulations for antimicrobial coating compositions.

| Exemplary weight | Min/max range, wt. % | Component | Examples and characteristics |
|---|---|---|---|
| 400 | 35.0 to 45.0 | Polyester resin 1 | includes hydroxyl functionality; viscosity of 20-30 ps @ 200° C.; a glass transition temperature ($T_g$) of 52°-58° C. |
| 100 | 5.0 to 15.0 | Polyester resin 2 | includes hydroxyl functionality; viscosity of 30-40 ps @ 200° C.; $T_g$ of 51-55° C. |
| 50 | 3.0 to 8.0 | Polyester resin 3 | includes hydroxyl functionality; viscosity of 35-45 ps @ 200° C.; $T_g$ of 56-62° C. |
| 30 | 1.5 to 5.0 | Curative | blocked aliphatic and aromatic polyisocyanate curative |
| 25 | 1.0 to 4.5 | Antimicrobial metal(s) | Transition metal, preferably having a molecular weight between 45 to 110 g/mol and a density of around 5.5 to 12 g/cm$^3$ and, more preferably, a molecular weight between 55 to 65 g/mol and a density around 6.5 to 9.0 g/cm$^3$; examples include: nickel, zinc, zirconium, molybdenum, |

TABLE 1-continued

Exemplary formulations for antimicrobial coating compositions.

| Exemplary weight | Min/max range, wt. % | Component | Examples and characteristics |
|---|---|---|---|
| | | | copper, and lead; provided as powder, preferably formed via an atomization process such as water-atomization, gas atomization, centrifugal atomization, or vacuum atomization |
| 5 | 0.01 to 0.09 | Silane | Trimethoxysilane (3-aminopropyl), Silicone dioxide-precipitated amorphous silicate (25%-35% active) |
| 330 | 30.0 to 40.0 | Glass flakes | Corrosion resistant glass flake; particle size distribution between 1700 μm-150 μm (80% or more) |
| 35 | 1.5 to 5.0 | Polyethylene Wax | Modified polyethylene wax, with a density of 1.04 (g/cm$^3$) and a melting point between 95-105° C. |
| 25 | 1.0 to 4.5 | Crosslinking Agent | Tetramethoxymethyl glycoloruil, with a molecular weight of 318 g/mol; melting point between 90°-110° C. |

Processing notes:
Admix polyester resins in tumbler (40-60 min) or via high speed mixer, e.g. MIXACO (45-50 sec) until components are fully blended. Gravity feed admixture and extrude at 300 RPM and 400 g/min feed rate via single or twin screw extruder, either having three temperature zones respectively set at 60°/60°/140° F. Extruded sheet product is ground (e.g. Retch mill or coffee grinder) for 1-5 minutes or using a Henschel high speed mixer for 15 to 25 seconds to form a powder with particle size 10-15 micrometers (μm).

In one embodiment, the formulation may be prepared by admixing the hydroxyl functional polyester resins, curative, antimicrobial metal(s) (in powdered form), silane, polyethylene wax, cross linking agent, spherical flakes and other components. The components are admixed either with a tumbler for 40-55 minutes or with a MIXACO high speed mixer used for blending raw material constituents for 45-50 seconds at ambient temperature and pressure or until such components are fully blended. The admixture is extruded to distribute the constituents and form an extrusion product. Any suitable extruder may be used and the extruder may utilize a single or twin screw mechanism. The blended material is placed in the extruder hopper and fed via the screw mechanism to the extruder dye, preferably with three temperature zones. The zone settings may be, respectively, 60°/60°/140° F. The blended constituents are extruded at 300 RPM and at a feed rate of 400 g/min to form an extrusion product.

The extrusion sheet product is then ground into particles with a suitable grinding machine such as a Retch mill grinder or coffee grinder. The extrusion product is grounded for about 1-5 minutes at ambient temperature and pressure to form a powder having a typical particle size (i.e., from at least 50% of all particles in the distribution and, more preferably, at least 90% of all particles up to approximately 95% to 99%, based upon both weight and volume) between about 5 μm to 50 μm and, more preferably, about 10 μm to 15 μm. A silica carrier is then mixed with the powdered extrudate to form the antimicrobial coating at a 1:1 ratio (silica carrier:powdered extrudate). The mixture is re-extruded and a Henschel high speed system is used to then blend the powder and micronize it, producing a final particle size of <5 μm. The chemical coating composition may then be applied and cured. In other iterations of this method, additional functional components are included in the admixture (as identified above, in terms of composition and/or weight percentage) prior to extrusion.

Notably, the metal(s) can be provided in powdered form. When employed, preferred particle sizes and distributions can be created by water-atomization production methods for such powdered metal(s). Certain forms of metal flakes may also be considered.

The antimicrobial coatings contemplated herein can be cured 10 min. @ 375° F. or 20 min. @ 350° F., using a convection oven such as a laboratory oven (e.g., Blue M made in White Deer, Pa.). The modifier is then milled or ground to a particle size that is appropriate for powder coating applications.

Identifying appropriate resins for the antimicrobial coating (i.e., three separate hydroxyl polyester resins), alternatives can be identified so long as they have the same chemical composition and similar characteristics—such as viscosity, Tg temperature, and/or differential scanning calorimetry—as the exemplary grades of material identified herein.

The formulation disclosed in Table 1 comprises a binder system. As such, it can be electrostatically sprayed onto various substrates (plastic, glass, wood, metal, aluminum, etc.) after extrusion. Thus, in one embodiment, the antimicrobial coating composition is a powdered or fusion coating, thereby delivering all the advantages of such systems (e.g., VOC- and solvent-free, durable, capable of being applied in greater thicknesses than corresponding liquids and paints, etc.).

TABLE 2

Time-lapsed performance of treated substrate against bacterial inoculum solution:

| Elapsed time | Average Number of Bacteria Recovered (CFU/mL) | Percent Reduction | Log Reduction |
|---|---|---|---|
| Initial | 5.0 × 10$^5$ | n/a | n/a |
| 1 hour | <1 | >99.9998 | >5.70 |

The results shown in Table 2 demonstrate that the bacteria was reduced from 500,000 CFU/ml was reduced to less than 1 CFU/mL showing a log reduction more than 5.70 which falls between our log rating of 5.5-6.5. Notably, the bacterial solution was applied to a substrate that had been coated with the inventive composition, although no pre-treatment or additional processing steps (beyond applying the coating) were required. The ability to maintain this percentage reduction may last up to twelve months after the coating is applied and cured.

Percent reduction is usually translated into log reduction by the following:
- 90% reduction=1 log reduction, i.e. 1,000,000 reduced to 100,000 is a 1 log reduction
- 99% reduction=2 log reduction, i.e. 1,000,000 reduced to 10,000 is a 2 log reduction
- 99.9% reduction=3 log reduction, i.e. 1,000,000 reduced to 1,000 is a 3 log reduction
- 99.99% reduction=4 log reduction, i.e. 1,000,000 reduced to 100 is a 4 log reduction
- 99.999% reduction=5 log reduction, i.e. 1,000,000 reduced to 10 is a 5 log reduction
- 99.9999% reduction=6 log reduction, i.e. 1,000,000 reduced to 1 is a 6 log reduction Further, it should be noted that while the antimicrobial coating disclosed herein nominally includes components that are common to conventional powder coatings, the ancillary, functional components (i.e. the non-resin components, such as anti-corrosion pigments, additional curatives/hardeners, degassing agents, anti-oxidants, and the like) can be provided to the remainder to enhance the properties of the stand-alone finished coating composition without detracting from its antimicrobial aspects.

Further, the composition disclosed herein has liquefying capabilities allowing it to be added to liquid as well as powder formulations. Here, the formulation is combined with water, preferably de-ionized and/or distilled, which will volatize the formulation after the initial coating. Typically, the antimicrobial coating is first provided as a solid to enable the formulator to decide upon the type and amount of solvents although, in some instances, the powder can be blended with talc (powdered form) at a 1:1 ratio using a Henschel high speed system for micronizing to arrive at a final particle size falling anywhere between 1 μm-3 μm. When liquefied, the liquid coating can be air compressed into an aerosol spray (a dispensing system which creates an aerosol mist of liquid particles), as is known in this field.

A silica carrier composed of untreated, medium particle sized precipitated silica (45%-55%) is then added to the ground extrudate (at a 1:1 ratio) produced via the table above. This mixture is then re-extruded and blended using a Henschel high speed system for micronizing to form a preferred embodiment, with the antimicrobial formulation's final particle size will be <5 μm. In other embodiments, the final ground extrudate from the table above can be ground to an optimized particle size (e.g., 100 nanometers to 5 micrometers) and adhered to a silica carrier such as (3-aminopropyl) trimethoxysilane and/or a silicone dioxide-precipitated amorphous silicate (45-55% active). Non-limiting examples of such carriers include Acematt HK450 or Sipernat 160, from Evonik, Germany, Zeolex 330 from Huber Inc., USA, and/or other forms of commercially available 3-aminopropyl trimethoxysilane/silicone dioxide precipitated amorphous silicates.

In identifying appropriate resins for the composition, alternatives can be identified so long as they have the same chemical composition and similar characteristics (e.g., viscosity, $T_g$ temperature, differential scanning calorimetry, etc.) as the exemplary grades of material identified herein.

The antimicrobial coating is specifically formulated to be directly applied on various substrate types such as plastic, metal, aluminum, wood, concrete, paper, cloth, stucco and a host of other materials to act as a shield against bacteria, germs and microbes. Further, it is not necessary to apply pretreatment or primers to the substrates prior to the application of the antimicrobial coating. Usually metal surfaces are pretreated and the surface preparation includes cleaning, either mechanical or chemical. Examples of application areas include labs, ATM machines, ticketing machines, telephones, computers, public transport (seats, handrails), factories (changing areas, production), furniture, water filtration equipment, medical (pharmaceutical packaging), hospitals, school/childcare facilities, airports, restaurants, fitness equipment and any other high-touch areas that could benefit from disinfection.

Advantages of the disclosed antimicrobial compositions include:

- It activates within 10 minutes of exposure to bacteria, germs and/or microbes and its percent reduction and log reduction remain consistent despite recontamination up to twelve months from application.
- In comparison to other antimicrobial coatings, it can be used as a liquid as well as a powder formulation. The coating formulation may be combined with water, preferably de-ionized and/or distilled. The ratio of water to the formulation is approximately 1:1, with 50% liquid added to 50% of the formulation. When the antimicrobial coating is combined with such a liquid carrier, the formulation volatizes after the initial coating. This mix would represent the final liquid antimicrobial coating composition. The antimicrobial coating component is a stand-alone powder coating solution.
- Unlike other antimicrobial coatings, there is no concentration to the center point. The coating is evenly distributed, allowing each covered area to have similar effectiveness. Other conventional coatings fail to produce an even distribution of coating, randomly allowing certain areas to be more effective than others.

Unless specifically noted, all tests and measurements are conducted in ambient conditions (e.g., temperature, pressure, humidity, etc.) according to commonly accepted measurement protocols (e.g., such as those regularly published by ASTM International) and relying upon commercially available instruments according to the manufacturer-recommended operating procedures and conditions. Specific tests and regimens identified by ASTM International may be particularly informative in characterizing the performance of the antimicrobial coating contemplated herein, specifically including ASTM E2149 (Standard Test Method for determining the antimicrobial activity of antimicrobial agents under dynamic contact condition). Unless noted to the contrary (explicitly or within the context of a given disclosure), all mass measurements are in grams, temperature measurements in degrees Celsius, and all percentages based upon weight percentages.

Although the embodiments of this disclosure have been disclosed, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

The invention claimed is:

1. An antimicrobial coating composition consisting essentially of:
   between 43.0 to 68.0 wt. % of at least one hydroxyl-functional polyester resin having a glass transition temperature between 51° C. and 62° C.;
   between 1.5 to 5.0 wt. % of one or more blocked aliphatic and/or aromatic polyisocyanate curatives;
   between 1.0 to 4.5 wt. % of an antimicrobial metal; and
   a remainder of ancillary functional components comprising a silane, glassflakes, a polyethylene wax and a cross linking agent.

2. The antimicrobial coating composition of claim 1 wherein the antimicrobial metal is atomized.

3. The antimicrobial coating composition of claim 1 wherein the antimicrobial metals are selected from: nickel, zinc, zirconium molybdenum, copper, lead, and any combination of two or more thereof.

4. The antimicrobial coating composition of claim 1 wherein the ancillary functional components consist essentially of the silane, glassflakes, the polyethylene wax, and the cross linking agent and wherein at least about three quarters of the ancillary functional components, by weight, are glassflakes.

5. The antimicrobial coating composition of claim 1 wherein the silane is trimethoxysilane (3-aminopropyl).

6. The antimicrobial coating composition of claim 1 wherein at least 80 wt. % of the glass flakes have particle sizes between 150 and 1,700 micrometers.

7. The antimicrobial coating composition of claim 1 wherein the hydroxyl-functional polyester resin consists of first, second, and third hydroxyl functional polyester resins, each of which has a separate glass transition temperature.

8. The antimicrobial coating composition of claim 7 wherein the glass transition temperature of the first hydroxyl-functional polyester resin is between 52° C. and 58° C., the glass transition temperature of the second hydroxyl-functional polyester resin is between 51° C. and 55° C., and the glass transition temperature of the third hydroxyl-functional polyester resin is between 56° C. and 62° C.

9. The antimicrobial coating composition of claim 8 wherein three times as much mass of the first hydroxyl-functional polyester resin is provided in comparison to the second and third hydroxyl-functional polyester resins.

10. The antimicrobial coating composition of claim 1 wherein the coating composition, when cured on a substrate, reduces bacteria by at least 99.999% when tested pursuant to ASTM E2149-13a.

11. The antimicrobial coating composition of claim 10 wherein, for up to twelve months after initially being cured, the cured substrate retains the bacterial reductions of at least 99.999% after the test pursuant to ASTM E2149-13a.

12. The antimicrobial coating composition of claim 10 wherein at least five minutes after curing, the bacterial reduction of at least 99.999% is realized pursuant to ASTM E2149-13a.

13. The antimicrobial coating composition of claim 1 wherein the composition is liquefied, applied to a substrate, and cured to create a film consisting essentially of the composition.

14. The antimicrobial coating composition of claim 1 wherein the composition is electrostatically sprayed or painted onto a substrate and cured to create a film consisting essentially of the composition.

15. The antimicrobial coating composition of claim 14 wherein the substrate is selected from a plastic member, a metallic member, a wooden member, a concrete member, paper, cloth, and stucco.

16. The antimicrobial coating composition of claim 13 wherein the substrate is selected from a plastic member, a metallic member, a wooden member a concrete member, paper, cloth, and stucco.

17. The antimicrobial coating composition of claim 1 wherein the coating composition, when cured on a substrate, prevents growth of *Staphylococcus aureus* (Staph), *Escherichia coli* (*E. coli*), Methicilllin-Resistant *Staphylococcus aureus* (MRSA) Vancomycin-Resistant *Enterecoccus faecalis* and *Enterobacter aerogenes* (VRE) on the substrate.

18. The antimicrobial coating composition of claim 1 wherein the ancillary functional components do not include any volatile organic compounds.

19. The antimicrobial coating composition of claim 1 wherein the ancillary functional components do not include any carcinogenic compounds.

20. The antimicrobial coating composition of claim 1 wherein the composition is extruded into particles having a size of 20 micrometers or less.

21. An antimicrobial coating composition comprising:
   a binder system including a silane, at least one hydroxyl-functional polyester resin, one or more blocked aliphatic and/or aromatic polyisocyanate curatives, and an antimicrobial metal powder selected from the group consisting of nickel, zinc, zirconium, molybdenum, copper, lead, and any combination of two or more thereof;
   wherein the coating composition does not contain volatile organic compounds; and
   wherein the coating composition, when cured on a substrate reduces bacteria by at least 99.9998% when tested pursuant to ASTM E2149-13a.

22. The antimicrobial coating composition of claim 21, wherein the silane consists essentially of trimethoxysilane (3-aminopropyl).

23. The antimicrobial coating composition of claim 21, wherein the binder system further comprises glass flakes, a polyethylene wax and a cross linking agent.

24. The antimicrobial coating composition of claim 23 wherein the binder system consists essentially of the hydroxyl-functional polyester resin(s), the blocked aliphatic and/or aromatic polyisocyanate curative(s), the antimicrobial metal powder, the glass flakes, the polyethylene wax, at least one or more cross linking agents, and the silane.

25. The antimicrobial coating composition of claim 24 wherein the silane is trimethoxysilane (3-aminopropyl).

26. A method of applying the coating composition, the method comprising
   preparing a powder consisting of the composition of claim 21;
   liquefying the powder in water; and
   applying and curing the mixture on a substrate.

27. The method of claim 26 further comprising mixing the powder with talc and micronizing the powder and the talc prior to liquefying the powder in water.

28. The method of claim 26 wherein the liquefied powder and water is air compressed with an aerosol spray prior to applying and curing the mixture on the substrate.

* * * * *